United States Patent
Lineback

(10) Patent No.: US 10,046,453 B1
(45) Date of Patent: Aug. 14, 2018

(54) WEED TRIMMER HEAT SHIELD

(71) Applicant: Michael D. Lineback, Jamestown, NC (US)

(72) Inventor: Michael D. Lineback, Jamestown, NC (US)

( * ) Notice: Subject to any disclaimer, the term of this patent is extended or adjusted under 35 U.S.C. 154(b) by 27 days.

(21) Appl. No.: 15/291,115

(22) Filed: Oct. 12, 2016

Related U.S. Application Data

(60) Provisional application No. 62/240,237, filed on Oct. 12, 2015.

(51) Int. Cl.
| | |
|---|---|
| *B25G 1/10* | (2006.01) |
| *B25G 3/00* | (2006.01) |
| *F16P 1/00* | (2006.01) |
| *A01D 34/00* | (2006.01) |
| *A01D 75/18* | (2006.01) |

(52) U.S. Cl.
CPC ............... *B25G 1/10* (2013.01); *B25G 3/00* (2013.01); *F16P 1/00* (2013.01); *A01D 34/001* (2013.01); *A01D 75/18* (2013.01); *Y10T 16/48* (2015.01)

(58) Field of Classification Search
CPC ..... B25G 1/10; B25G 3/00; F16P 1/00; A01D 34/001; A01D 75/18; Y10T 16/4713; Y10T 16/476; Y10T 16/48
USPC ...... 16/431, 426, 430; 30/276, 286; 294/131
See application file for complete search history.

(56) References Cited

U.S. PATENT DOCUMENTS

| | | | | |
|---|---|---|---|---|
| 2,577,561 A | * | 12/1951 | Atwater | B60N 2/4666 296/153 |
| 8,328,253 B2 | * | 12/2012 | Wales | A47J 37/1271 294/131 |
| 8,544,913 B2 | * | 10/2013 | Janocha | A47J 37/0786 294/131 |
| 9,751,148 B2 | * | 9/2017 | Sharrow | B23K 5/00 |
| 2011/0187137 A1 | * | 8/2011 | Wales | A47J 37/1271 294/7 |

* cited by examiner

*Primary Examiner* — William Miller
(74) *Attorney, Agent, or Firm* — MacCord Mason PLLC

(57) ABSTRACT

Armrest heat shield and handheld device systems and methods are shown and described. In one embodiment, the armrest heat shield includes a guard and a clamp. In another embodiment, a handheld device includes an elongated shaft, a gas powered motor, a cutting assembly, and an armrest heat shield aligned sustainably parallel on the shaft above the motor.

8 Claims, 3 Drawing Sheets

WEED TRIMMER HEAT SHIELD

This application claims the benefit of U.S. provisional application No. 62/240,237, filed Oct. 12, 2015, which is incorporated herein by reference in its entirety.

FIELD OF THE TECHNOLOGY

The present disclosure relates generally to lawn and garden equipment, and more particularly to improved armrest heat shield systems and methods.

BACKGROUND

It is desirable to use hand-held powered devices to trim weeds, grass, edgings, bushes, and the like for maintaining natural areas. One type of handled device is a weed trimmer powered by an engine opposite a cutting end, while those of ordinary skill in the art having the benefit of this disclosure will recognize a variety of similar handheld devices having any type of shaft, or the like, opposing an engine, motor, or similar heat generating assembly.

Classical handheld motor devices present heat concerns generated from motor/engine heat and sparks and the like, particularly when used for extended periods of time. Further, traditional methods and devices present ergonomic issues and fail to provide proper and efficient safety orientation and particular during prolonged use.

Therefore, Applicant desires systems and methods for hand-held powered devices and armrest heat shields, without the drawbacks presented by the traditional systems and methods.

SUMMARY

In accordance with the present disclosure, armrest heat shields and hand-held powered devices are provided to lawn and garden activities. This disclosure provides improved apparatuses and methods that are convenient, efficient, and safe for the user, particularly when used for prolonged periods.

In one embodiment, a heat shield guard includes a proximate member having an attachment platform; a distal member separated from and substantially parallel with the proximate member; a first inclined member being spatially offset the distal member and having a shield surface; and a second inclined member being spatially offset the proximate member, and wherein the second inclined member being spatially offset from the first inclined member.

In another embodiment, a device that mates with an elongated shaft adjacent an engine includes a clamp comprising a first substantially planar flange and an opposing second substantially planar flange, a central receiving cavity aligned between the first planar flange and the second planar flange, wherein the first planar flange having an attachment point and the second planar flange having an attachment point; and a guard including a proximate member having a substantially flat surface adapted to mate with the first planar flange and the second planar flange; a distal member having an upper shield surface and being substantially parallel with the proximate member; a first inclined member having an elongated shield surface and extending adjacent to the distal member; and a second inclined member aligned between the first inclined member and the proximate member, and wherein the second inclined member being spatially offset from the first inclined member.

In certain examples, the first inclined member has a tapered end and a widened end. The widened end may be aligned adjacent the distal member and the tapered end may be aligned adjacent the second inclined member. Further, the widened end may have a width dimension larger than a width dimension of the tapered end.

In some examples, the proximate member is offset the second inclined member. Further, the second inclined member may be offset the proximate member. The distal member may be offset the second inclined member. The distal member may be offset the second inclined member. Further, the device may include a fastener to secure the planar flange about the proximate member.

In certain examples, the first planar flange may have an attachment point. The attachment point may be a guard aperture. The second planar flange may have an attachment point. The attachment point may be a guard aperture.

In another embodiment, an armrest heat shield for mating with a handheld device having an engine and an elongated shaft opposing the engine includes a guard having a distal member and a proximate member being substantially parallel to the distal member, a first inclined member adjacent to the distal member, and a second inclined member adjacent to the proximate member, and wherein the first inclined member being aligned offset from the second inclined member; and a clamp having a concave receiving cavity adapted to mate with the elongated shaft adjacent the engine, and at least one attachment point adapted to mate with the proximate member.

In some examples, a fastener secures the guard about the clamp in a semi-fixed position. The first inclined member may be offset the proximate member. The first inclined member may be offset the distal member. The second inclined member may be offset the proximate member. The second inclined member may be offset the distal member.

Yet another embodiment includes an armrest heat shield for mating with a handheld device having an engine and an elongated shaft opposing the engine, the device comprises guard having a distal member and a proximate member being substantially parallel to the distal member, a first inclined member adjacent to the distal member, and a second inclined member adjacent to the proximate member, and wherein the first inclined member being aligned offset from the second inclined member; and a clamp having a pair of opposing flanges adjacent a concave receiving cavity. The concave cavity adapted to mate with the elongated shaft adjacent the engine.

In particular examples, the device includes a fastener adapted to secure the guard about the clamp in a semi-fixed position.

In another embodiment, a weed trimmer includes an elongated shaft; a gas powered motor, wherein the motor being mounted on a first end of the shaft; a cutting assembly, wherein the cutting assembly being mounted on a second end of the shaft; and an armrest heat shield aligned sustainably parallel on the shaft above the motor.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
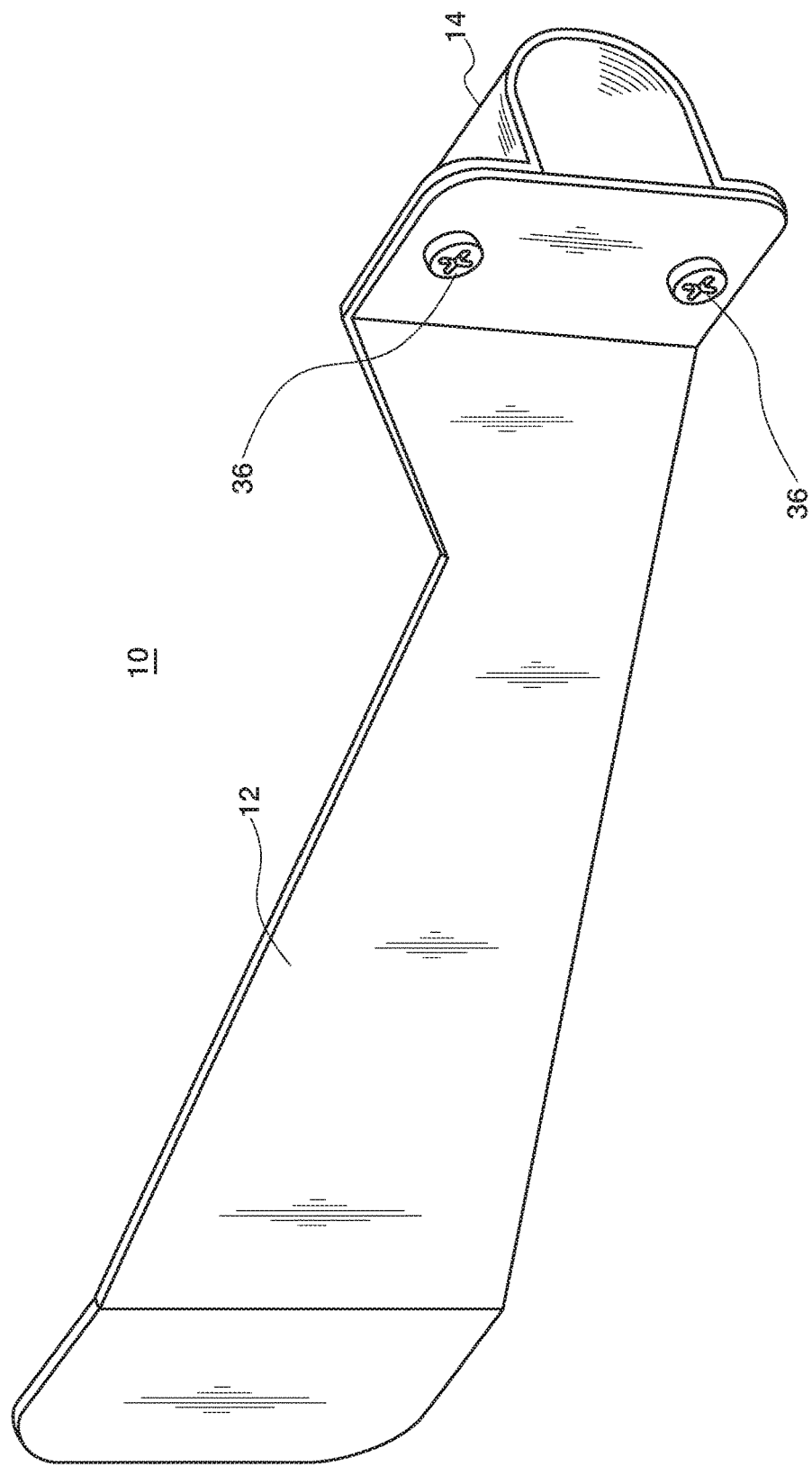
FIG. 1 is a front perspective view of one embodiment of an armrest heat shield according to the present disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing embodiments of the disclosure and are not intended to limit the disclosure or any invention thereto. As best seen in FIG. 1, one embodiment of the armrest heat shield device 10 is shown having a guard 12 and clamp 14. The armrest heat shield 10 may include any variety of attachment points, or the like, to secure guard 12 about clamp 14, for instance the mechanical fasteners 36, shown in FIG. 1.

Figure 2:
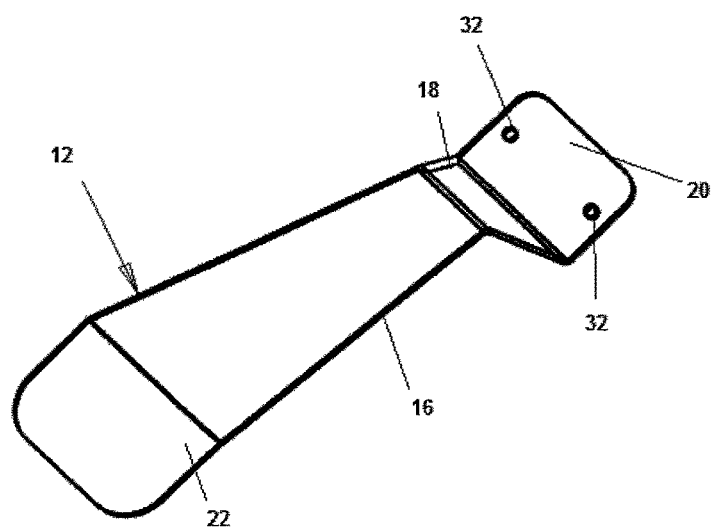
FIG. 2 is a bottom perspective view of an isolated guard introduced in FIG. 1.
Figure 3:
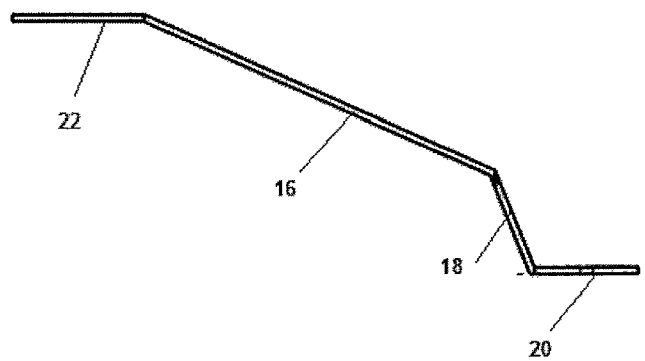
FIG. 3 is a side view of an isolated guard introduced in FIG. 1.
Figure 4:
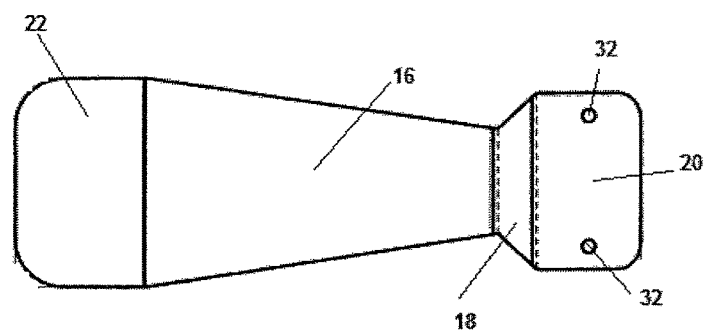
FIG. 4 is a bottom perspective view of an isolated guard introduced in FIG. 1.

FIGS. 2-4 illustrate one embodiment of the guard 12 having a distal first parallel member 22 that is generally parallel to proximate second parallel member 20. In addition, the guard 12 includes a first inclined member 16 adjacent distal member 22. Guard 12 includes a second inclined member 18 adjacent proximate member 22. As shown, the first inclined member 16 is adjacent and offset, i.e. substantially angled in a non-planar alignment, second inclined member 18, and generally spaces the opposing parallel members 20 and 22, respectively. The proximate member 20 may include guard apertures 32 to generally receive any of the fasteners shown and described herein. Those of ordinary skill in the art having the benefit of this disclosure will recognize a plurality of other shaft arrangements, including but not limited to, permanent securement of the guard to the shaft of the like, with or without a clamp.

The guard may mate with the clamp in a variety of arrangements to match any type of motorized assemblies. For instance, the clamp 14 may provide a female end, cavity, or the like to receive any type of elongated shaft or similar feature.

Figure 5:
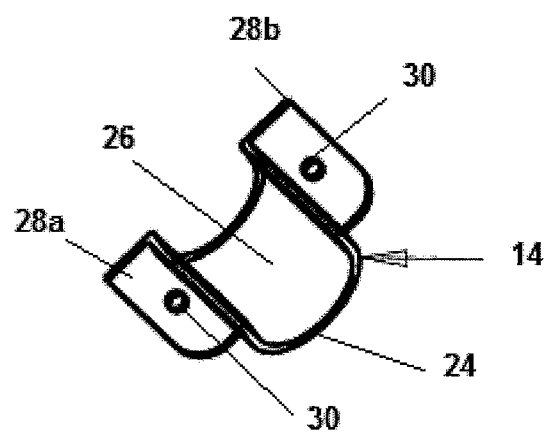
FIG. 5 is a bottom perspective view of an isolated clamp introduced in FIG. 1.
Figure 6:
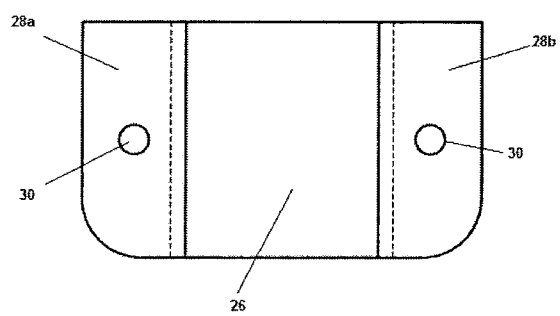
FIG. 6 is a top view of an isolated clamp introduced in FIG. 1.
Figure 7:
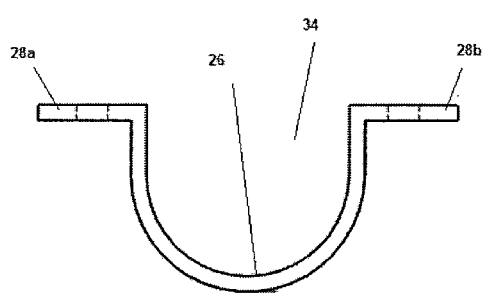
FIG. 7 is a side view of an isolated clamp introduced in FIG. 1.

FIGS. 5-7 illustrate one embodiment of the clamp 14 having a central receiving cavity 26 with a pair of opposing flanges 28a, 28b. As illustrated, the receiving cavity 26 typically includes an engagement opening 34 to mate with a device shaft as shown and described herein. Further, the opposing flanges 28a, 28b may include clamp apertures 30 to receive and retain any of the fasteners shown and described herein in a semi-fixed position, thereby securing the device 10 to a handheld machine.

The weed trimmer may include an elongated shaft, a motor, a cutting assembly, and an armrest heat shield device. The motor is typically mounted on a first end of the shaft that is generally positioned below a user's hand/arm in an operating position. The weed trimmer may include a variety of shaft dimensions, arrangements, sizes, and orientations as understood by those skilled in the art having the benefit of this disclosure. The armrest heat shield device may be temporarily aligned above the motor and below the user's hand/arm to relieve burn concerns, and the like. For instance, the armrest heat shield may be aligned sustainably parallel on the shaft above motor. Alternative embodiments include the armrest heat shield permanently affixed to the motor or the like. Further, the cutting assembly is typically mounted on a second end of the shaft. However, other embodiments include a variety of orientations of the cutting assembly about the shaft or the like.

In alternative embodiments, elements of the armrest heat shield may be bent and/or rotated to mate with particular shafts and device assemblies for optimal usage and/or to provide improved comfort during operation.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What is claimed is:

1. A device adapted to mate with an elongated shaft adjacent an engine, said device comprising:
   a. a clamp comprising a first substantially planar flange and an opposing second substantially planar flange, a central receiving cavity aligned between said first planar flange and said second planar flange, for mating with said elongated shaft adjacent said engine wherein said first planar flange having an attachment point and said second planar flange having an attachment point; and
   b. a guard comprising:
      i. a proximate member having a substantially flat surface mating with said first planar flange and said second planar flange;
      ii. a distal member having an upper shield surface substantially parallel with said proximate member;
      iii. a first inclined member having an elongated shield surface and extending adjacent to said distal member; and
      iv. a second inclined member aligned between said first inclined member and said proximate member, and wherein said second inclined member is angled in a non-planar alignment from said first inclined member.

2. The device of claim 1, wherein said first inclined member having a tapered end and a widened end.

3. The device of claim 2, wherein said widened end aligned adjacent said distal member and said tapered end aligned adjacent said second inclined member.

4. The device of claim 2, wherein said widened end having a width dimension larger than a width dimension of said tapered end.

5. The device of claim 1, wherein said first inclined member having a tapering body portion.

6. The device of claim 1, including a fastener adapted to secure said planar flanges about said proximate member.

7. An armrest heat shield system for mating with a handheld device having an engine and an elongated shaft opposing said engine, said system comprising:
   a. a guard having a distal member and a proximate member being substantially parallel to said distal member, a first inclined member adjacent to said distal member, and a second inclined member adjacent to said proximate member, and wherein said first inclined member being angled in a non-planar alignment from said second inclined member; and
   b. a clamp having a concave receiving cavity mating with said elongated shaft adjacent said engine, and at least one attachment point adapted to mate with said proximate member.

8. The system of claim 7, further including a fastener securing said guard about said clamp in a semi-fixed position.

\* \* \* \* \*